Patented Feb. 13, 1945

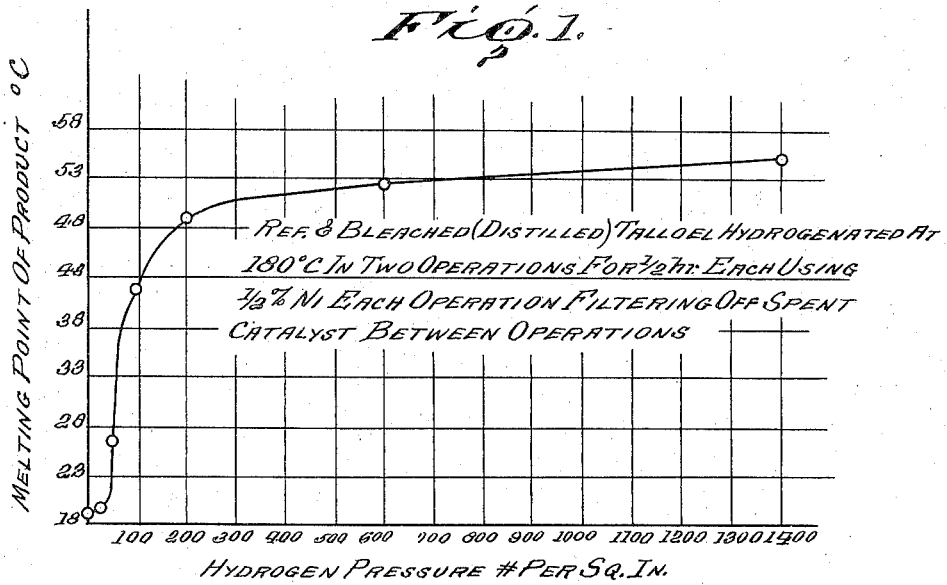
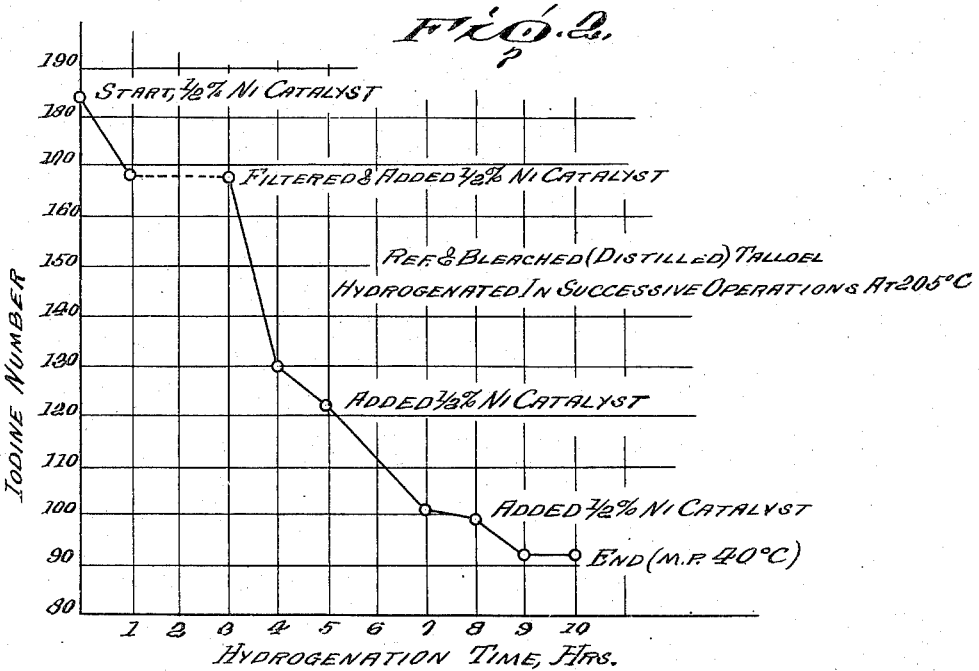

2,369,446

UNITED STATES PATENT OFFICE 2,369,446

HYDROGENATION OF TALL OIL

Russell G. Dressler and Robert E. Vivian,
Los Angeles, Calif.

Application August 22, 1939, Serial No. 291,398

4 Claims. (Cl. 260—97.5)

This patent pertains to the hydrogenation of tall oil and to a new and useful product, hydrogenated tall oil.

Crude tall oil is a by- or waste-product of the sulfate or soda processes of the pulp and paper industry. In general, the term is associated with the sulfate process.

Tall oil is a complex material, the chemical composition of which is little known. It contains unsaturated fatty acids in simple or polymerized form, liquid and solid resin acids virtually unknown as to structure, and unsaponifiable matter containing sterols. Any attempted quantitative analysis of the three mentioned principal constituent bodies of tall oil results only in an arbitrary classification. It has been shown that tall oil is a material which is specific in its character and chemical properties, and not to be duplicated by a simple blending of ingredients.

Samples of tall oil vary considerable in composition, with respect to content of resin acids, fatty acids, and unsaponifiable matters. Typical specimens of tall oil as produced in the United States show that crude tall oil may contain from 30 to 65 percent of resin acids, 40 to 60 percent of fatty acids, and up to 10 percent of unsaponifiable matters; while refined and bleached (or distilled) tall oil may contain, for example, from 35 to 40 percent of resin acids, 50 to 60 percent of fatty acids, and up to 10 percent of unsaponifiable matter. By way of specific example, the materials employed during the work involving the experimental examples set out below had the following characteristics: crude tall oil—33.6 percent resin acids, 56 percent fatty acids, 8.3 percent unsaponifiable matter, iodine number 166 (modified Wijs), thiocyanogen number 74.4, acid number 154, melting point 20 degrees C., sulphur content .08 percent; while the refined and bleached (distilled) tall oil comprised 38.5 percent resin acids, 51 percent fatty acids, 4.6 percent unsaponifiable matter, iodine number 161, thiocyanogen number 64, acid number 164, melting point 19 degrees C., sulphur content .06 percent.

Crude tall oil has found little application in industry due to its black or dark brown color, liquidity, and stickiness, and due to its non-uniformity of chemical composition. The odor is that of pine oil products, along with a distinct smell of mercaptans, and hence is offensive and renders the product unsuitable for general commercial purposes. This material normally appears on the market in a semi-solid state, as a viscous liquid containing varying amounts of suspended solid ingredients, which makes it difficult to handle commercially. The product known to commerce as "distilled tall oil," although it may have been improved somewhat as to color, being orange to brown, still has the disadvantages of being of pine or aromatic odor (with a definite indication of mercaptans), sticky, and non-uniform in physical and chemical composition.

The tall oils are very difficult to hydrogenate; and success is not achieved by applying methods commonly used in hydrogenating vegetable oils or fatty acids. A procedure of attempted hydrogenation of resin acids, for example, can lead not only to the addition of hydrogen at the double (unsaturated) bonds, but also to rearrangement and displacements of original hydrogen under the conditions of treatment, as well as to actual dehydrogenation and establishment of further double bonds. Attempts to hydrogenate these tall oils by ordinary means, such as used for hydrogenating cottonseed oil, for example, fail due to the difficulty of hydrogenation because of the nature of the material, and because of the presence of sulfur-bearing and other accumulated or natural catalytic poisons. It has been found that the crude tall oil is more difficult to hydrogenate than the distilled tall oil, although analyses have shown that their total sulfur contents are practically the same. We have found it necessary to provide conditions so that the reaction rate of hydrogenation is far higher than with cottonseed oil. Further, while crude cottonseed oil and the like contain catalyst poisons, it is feasible to eliminate such poisons by a simple refining treatment with caustic soda solution, but in the case of tall oil, this soda-refining treatment cannot be successfully applied on either the crude or the distilled tall oil because of the chemical composition of the material.

Even excessive amounts of catalyst do not give success. The required long period of contact (100 hours for example) between the catalyst and the tall oil lead to discoloration and degeneration of the products, and the product has a greenish color, owing to the presence of nickel compounds produced from the catalyst, as well as discoloration from the decomposition and degeneration of tall oil substances, indicating a lessened efficiency of the operation. The materials cannot be commercially employed where a quality material is required, such as in the manufacture of a high grade soap, due to the presence of green nickel soaps and the decomposition products of the tall oil.

EXAMPLE I

As a comparison between the difficulties of hydrogenating cottonseed oil and tall oil, comparative tests were made with a standard refined cottonseed oil, and with a refined and bleached tall oil. Three commercial catalysts, as employed with cottonseed oil, were provided. Catalyst #1 was prepared by precipitating nickel and copper sulfates with sodium carbonate and effecting a dry reduction at 800 to 900 degrees F. in hydrogen, the copper content being 25 percent by weight of the nickel content. Catalyst #2 was similarly prepared and wet reduced for two hours at 225 degrees C., corresponding to commercial practice, the copper content being 20 percent of the nickel content. Catalyst #3 was prepared from nickel and nitric acid, followed by ammonia precipitation and dry reduction in hydrogen for one hour. The hydrogenation was effected on 200 gram samples, at a temperature of 205 degrees C. with a flow of hydrogen at a pressure of 5 to 10 pounds per square inch, for a time of one hour. The results were:

TABLE I

*Test of activity of catalysts on a standard, refined cottonseed oil*

| Catalyst used | Amt. catalyst in oil used, based on 200 gms. oil sample | Nickel cont. based on 200 gms. oil sample | I. No. of oil start | I. No. of oil end | I. No. drop |
|---|---|---|---|---|---|
| | Percent | | | | |
| Catalyst #1 | 1.5 | 0.08% Ni | 104 | 77 | 27 |
| Catalyst #2 | 3.0 | .17% Ni | 103 | 94 | 9 |
| Catalyst #3 | 2.5 | .13% Ni | 104 | 85 | 19 |

TABLE II

*Attempted hydrogenation of refined and bleached tall oil*

| Catalyst used | Amt. catalyst in oil used | Nickel content | I. No. of tall oil start | I. No. of tall oil end | I. No. drop |
|---|---|---|---|---|---|
| | Percent | Percent | | | |
| Catalyst #1 | 1.5 | 0.08 | 185 | 185 | 0 |
| Catalyst #2 | 3.0 | .17 | 183 | 183 | 0 |
| Catalyst #3 | 2.5 | .13 | 182 | 182 | 0 |

TABLE III

*Effect of using spent catalyst of Table II for attempted hydrogenation of a standard refined cottonseed oil*

| Catalyst used | Amt. catalyst in oil used | Nickel content | I. No. of oil start | I. No. of oil end | I. No. drop |
|---|---|---|---|---|---|
| | Percent | Percent | | | |
| Catalyst #1 | 1.5 | 0.08 | 105 | 105 | 0 |
| Catalyst #2 | 3.0 | .17 | 106 | 106 | 0 |
| Catalyst #3 | 2.5 | .13 | 105 | 105 | 0 |

Table II shows the lack of drop in iodine number, indicating substantial absence of hydrogenation of the refined and bleached tall oil. Table III shows that the catalyst was so poisoned by contact with tall oil that no hydrogenation action could be produced, even with standard procedures on cottonseed oil.

The difficulty of hydrogenating tall oil as compared to the difficulty of hydrogenating the usual cottonseed oil, or other material of this nature, can be seen, which explains why tall oil has not heretofore been successfully hydrogenated commercially.

Our method consists of treating a tall oil with hydrogen, under the proper conditions as to pressure and temperature, in the presence of the required amount of a suitable catalyst and with maintenance of a high reaction rate including precautions for maintenance of unpoisoned catalyst, until the desired degree of hardness or saturation is reached.

The accompanying drawing graphically indicates the behavior of tall oil during hydrogenation. Figure 1 shows the relationship of hydrogen pressure to melting point, when two successive portions of ½ percent of nickel catalyst were employed at 180 degrees C., for one-half hour each. Figure 2 indicates the behavior of tall oil when subjected to hydrogenation with successive portions of catalyst.

According to the present process of converting tall oils by hydrogenation, commercially valuable, new and useful products have been obtained which upon tests, both physically and chemically, have been found to exhibit desirable qualities. The hydrogenated products are of much lighter and improved color, of increased stability, practically odorless, free from stickiness, physically homogeneous, and exceedingly more uniform in composition. In particular, it has been found that even a slight actual hydrogenation is advantageous, as the product is less subject to oxidation; this result being due to the elimination of high unsaturates from the composition, as indicated by the changes in stability and odor.

A suitable procedure consists of treatment of the tall oil at temperatures between 100 degrees C. and 250 degrees C. with hydrogen gas at pressures from 50 pounds to 2500 pounds, and preferably above 200 pounds (usually 200 to 600 pounds for commercial practice) per square inch, and using nickel or other metallic catalysts or mixtures of catalysts of similar nature. For economy in equipment costs, 2500 pounds pressure presently appears as an upper limit of operating pressures. From Figure 1, it will be noted that the graph relation of pressure to hydrogenation effect has a bend at approximately 200 pounds. With the higher pressures, correspondingly lesser times and temperatures can be employed with lesser tendency for poisoning of the catalyst, due to the increased hydrogen concentration and the higher reaction rate in the hydrogen-catalyst-tall oil system. The preferred temperature is from 150 to 180 degrees C. At temperatures approaching 250 degrees C., decompositions sometimes occur which lead to discoloration of the product, and at temperatures above 250 degrees C., the decompositions with many species of tall oil attain a proportion which renders the procedure uneconomical. In general, accelerations of the hydrogen-catalyst-tall oil reaction and the poison-catalyst reaction are each favored by increased temperatures, while the temperatures below 150 degrees C. demand high pressures of the order of 2000 pounds or over for successful conduct, in order to assure a sufficient presence of hydrogen at the catalytic surfaces to avoid excessive poisoning during the time required for the operation.

Differing conditions of times, temperatures, and pressures permit controlling the process as to degree of saturation desired. Conditions favorable to a higher degree of saturation during the hydrogenation operation comprise a longer time of hydrogenation, a larger proportion of catalyst, and higher hydrogen pressures. Both the physical and chemical properties of hydrogenated tall oil products depend on the degree of saturation, and tall oil products of different degrees of saturation may be used for different commercial purposes. For example, in manufacturing liquid soaps, a product of low hydrogenation with a melting point of about 25 degrees C. is preferable; while for manufacture of a high-titre laundry soap, a hydrogenation tall oil product of melting point 50 degrees C. is preferable.

EXAMPLE II

As examples of the effect of hydrogenation pressure on rate of reaction and equilibrium conditions, the following table shows the relation of various hydrogen pressures which were used, and the characteristics of products made. The original or starting material was in each case a sample of refined and bleached tall oil of the above characteristics, of greatly improved color over crude tall oil. The trials were made with samples of 150 grams each at 180 degrees C., by hydrogenating at the indicated pressure using 0.5 percent of nickel (on diatomaceous earth) for ½ hour, filtering off catalyst with care to remove this spent or poisoned catalyst, and adding a fresh portion of ½ percent nickel (on diatomaceous earth) and continuing hydrogenation for another ½ hour at 180 degrees C.

Table showing effect of $H_2$ pressure on hydrogenated product made

| Hydrogen pressure used | Characteristics of hydrogenated product made | |
|---|---|---|
| | Thiocyanogen value | Melting point |
| | | °C. |
| 50 lbs | 57.5 | 27 |
| 100 lbs | 49.2 | 42 |
| 200 lbs | 37.1 | 49 |
| 600 lbs | 23.6 | 52 |
| 1,400 lbs | 21.1 | 55 |

In each instance, the product had lost both the mercaptan odor and also the pine odor, and had attained pleasant fatty aroma. We have found that this change has occurred in various products having a melting point above 25 degrees C.

Thiocyanogen values have been found much more reliable than iodine numbers for the study and control of the process of hydrogenating tall oils.

For best results in hydrogenating tall oils, an intimate and quick mixing of catalyst, tall oil and hydrogen is necessary to prevent deterioration of the catalyst with time of contact. When tall oil or hydrogenated tall oil products are in a hot melted state, they are best kept in an inert atmosphere, to prevent gradual darkening of color. Any suitable non-oxidizing and non-halogenating atmosphere may be used for this purpose, such as hydrogen, carbon dioxide, nitrogen, or the rare gaseous elements.

Studies of the mechanism and course of the reaction, and analysis of the original tall oils and of the hydrogenated products, indicate that both the resin acids and the fatty acids undergo change due to a full or partial saturation of the unsaturated bonds.

EXAMPLE III

As an illustration of the foregoing statement, a sample of refined and bleached tall oil when separated into its constituent groups and analyzed for unsaturation, showed the following:

| Group | Iodine number (Wijs) | Thiocyanogen No. |
|---|---|---|
| Fatty acid | 113 | |
| Resin acid | 165 | 38.2 |
| Unsaponifiable | 169 | |

Hydrogenation was effected to obtain a product having a melting point of 40 degrees C., which was separated and analyzed for unsaturation and showed:

| Group | Iodine number (Wijs) | Thiocyanogen No. |
|---|---|---|
| Fatty acid | 71 | |
| Resin acid | 97 | 16.9 |
| Unsaponifiable | 171 | |

The separated fatty acids of the original material were liquid, while the separated fatty acids of the hydrogenated product were solid.

These new hydrogenated products are capable of extensive use in industries requiring material of this nature, such as those engaged in the manufacture of soaps, rubber, greases and lubricants, etc. The product has valuable physical and chemical properties, as compared with the initial materials, in addition to its relative cheapness. It can, of course, be used advantageously to replace ordinary tall oil in its crude or refined condition, with the advantages of the higher melting point and lower unsaturation of the hydrogenated material. The hydrogenated products are characterized by their fatty nature which allows them to be used in processing industries where fatty materials are now used. Thus, they may be used to replace commerical oleic and stearic acids and other vegetable and animal oils and fats in soaps, textile dressings, etc.

It has been found that poisoning of the catalyst occurs rapidly, and is usually complete within an hour in laboratory practice. In commercial practice, a somewhat longer time is sometimes endured by the catalyst, corresponding to the usual rate of hydrogenation itself, but poisoning occurs and the several reactions show typical graphs which are similar in laboratory and commercial practice. Hence, it is desirable to subject the material to temperature and pressure immediately upon mixing with the catalyst; and to carry on the reaction rapidly, which is possible when high pressures are used. The reaction rate is of great importance, and the actual time of contact with the gas is a lesser consideration, because after the catalyst is poisoned, no appreciable reaction occurs regardless of the time of running; and the reaction can be stimulated only by the use of fresh catalyst.

The increase of hydrogen pressure, however, does not lead to proportionate increases of melting point, and Figure 1 of the attached drawing shows graphically the effect of hydrogen pressures from 1 pound to 200 pounds in obtaining successively higher melting points, with a decrease of this relative effect at pressures above 200 pounds. When it is sought to obtain an optimum condition of hydrogenation for this particular specimen, in a quick and economical manner, the operation should be conducted at pressures in excess of 200 pounds per square inch.

Example IV 150 grams of orange-colored, liquid, refined and bleached tall oil of the aforesaid characteristics was treated at 180 degrees C. for ½ hour with hydrogen at a pressure of 50 pounds per square inch in the presence of 0.5 percent of precipitated nickel, based on the weight of tall oil taken. The nickel had been prepared, as customary, by precipitating on diatomaceous earth. At the end of the ½ hour hydrogenation treatment, the catalyst was filtered off, and another 0.5 percent of fresh nickel catalyst was added, and hydrogenation continued another ½ hour under the same conditions. After filtering of the catalyst, the hydrogenated product had an iodine number 109 (modified Wijs), thiocyanogen value 57.5, and melting point 27 degrees C. This product was a soft solid of petrolatum-like consistency, having no appreciable or characteristic tall oil odor, and having a light yellow color.

Example V

As a second example, a sample of distilled tall oil was hydrogenated for ½ hour at 180 degrees C. with 1400 pounds hydrogen pressure using 0.5 percent of nickel as catalyst which yielded a light yellow product of melting point 33 degrees C., and iodine number 138.

Example VI

In another run, refined and bleached tall oil was hydrogenated for ½ hour at 150 degrees C. and 1400 pounds per square inch hydrogen pressure using 0.5 percent of nickel as catalyst, filtered, and again similarly hydrogenated with a second 0.5 percent of nickel catalyst for an overall treating time of one hour to yield an odorless product of iodine number 60 (modified Wijs), thiocyanogen value 21.1, melting point 55 degrees C., and of white-yellow color. In further experiments, it has been found that there is no substantial difference in the melting point and iodine number, for a given time of treatment at around 1400 pounds, if the temperature is increased from 150 to 180 degrees C.

Example VII

For comparison, a sample of refined and bleached (distilled) tall oil was hydrogenated at 1400 pounds and at 180 degrees C. for one hour, using 5.0 percent of nickel as catalyst added in one batch at the beginning. The melting point of the resulting product was 52 degrees C., of iodine number 65 and thiocyanogen number 24 (interpolated). This indicates the advantage of adding the catalyst in small portions at a time; and of removing the poisoned catalyst before adding fresh catalyst, as the presence of poisoned catalyst appears to have an inactivating effect upon fresh catalyst when added. In one experiment, for example, about four times the amount of hydrogenation was obtained when the spent catalyst was filtered off before adding fresh catalyst, as indicated by the graph shown in Figure 2 of the drawing.

The hydrogenation of refined and bleached tall oil can be effected while dissolved in a suitable solvent.

Example VIII 100 grams of refined and bleached tall oil was dissolved in 50 grams of 95 percent ethyl alcohol and hydrogenated at 1800 pounds per square inch hydrogen pressure for one hour while at a temperature of 160 degrees C. and while using 2 grams of unsupported, finely-divided, prepared nickel for catalyst; the product made was of light color, practically odorless, and had a melting point of 39 degrees C.

Crude tall oil can likewise be hydrogenated, preferably after proper pre-treatment to remove catalytic poisons, the details of which are given in our co-pending patent application, such as by means of spent catalyst, bleaching clays or other adsorbents, either directly or while the tall oil is dissolved in a suitable solvent, followed by filtering off the treating agent before proceeding with hydrogenation.

Example IX 200 grams of crude tall oil of the aforesaid characteristics were treated as follows: To the sample was added 15 grams of an adsorbent clay, such as used for bleaching fatty oils, and the mixture agitated for 15 minutes at 110–120 degrees C. in a non-oxidizing atmosphere, such as hydrogen. As a result of this pre-treatment, the tall oil is not appreciably bleached in color, but is markedly de-poisoned so that, in the hydrogenation treatment that follows, the catalyst retains its efficiency longer. After pre-treating, the sample in this case was hydrogenated four times for ½ hour each at 180 degrees C. and 200 pounds hydrogen pressure using portions of 0.5 percent nickel catalyst and filtering off spent catalyst each time before adding the fresh portion. At the end of this pre-treatment and hydrogenation, we obtained a hydrogenated tall oil of iodine number 75 (modified Wijs), thiocyanogen value 33, and melting point 48 degrees C. The product was of improved color, being of yellow color as contrasted to the black brown crude tall oil which was used as starting material.

Example X

A 15 percent solution of the crude tall oil by weight in cleaner's naphtha was treated with a bleaching clay. The amount of clay was 1 gram to each 3 grams of crude tall oil. Treatment was for five minutes at 105–110 degrees C. in an atmosphere of hydrogen. The treated solution was filtered and then the solvent steam-distilled. The pre-treated tall oil was of yellow color and had been de-poisoned. 100 grams of this pre-treated tall oil were hydrogenated for one hour at 180 degrees C. and 1400 pounds hydrogen pressure using 0.5 percent of nickel (on diatomaceous earth) as catalyst which gave a hydrogenated product of light yellow color and melting point 29 degrees C.

Other examples of pre-treatment are set out in our co-pending application, Serial No. 302,056, filed October 30, 1939.

Example XI

As an indication of the behavior of resin acids under the stated hydrogenation conditions, a sample of 100 grams of resin acids, which had been separated from crude tall oil, was hydrogenated at 180 degrees C. and 1000 pounds pressure, for one hour. The thiocyanogen number dropped from the original 63.7 to 46.2, indicating that some hydrogenation had occurred, but there was no substantial change in the physical appearance of the resin acids.

As stated above, the high pressures of hydrogen are advantageous because they increase the rate of the hydrogenation reaction. This reaction involves the tall oil, the catalyst, and hydrogen; and a greater quantity of hydrogen present produces a greater effective concentration of the hydrogen at the catalytic surfaces and increases the reaction rate. On the other hand, poisoning of the catalyst occurs principally between the tall oil (including its impurities) and the catalyst, that is, between a liquid and a solid, and there is no gaseous phase involved; and therefore high pressures do not appreciably increase the rate of poisoning reaction nor does the hydrogen itself appear to play any substantial part in the rate of such poisoning.

The various hydrogenating catalysts can be employed. Among the catalysts which have been found effective are finely divided nickel, nickel deposited on diatomaceous earth, and nickel with copper as a co-catalyst, together with platinum, palladium, and nickel with other metals as co-catalysts or accelerators or promoters.

It is obvious that the invention is not limited to the specific examples shown, but that the process may be practiced and products obtained under other conditions within the scope of the appended claims.

We claim:

1. The process of increasing the melting point and decreasing the iodine value of crude tall oil and eliminating pine and mercaptan odors therefrom, which comprises intimately mixing a finely divided solid adsorbent material with the crude tall oil and heating the same at substantially 105-120 degrees C. for effecting the adsorption and removal of catalyst-poisons, removing the adsorbent material and then subjecting the body of the treated tall oil to a temperature of substantially 150-180 degrees C. in the presence of hydrogen under a superatmospheric pressure of 200-600 pounds per square inch and in the presence of a hydrogenating catalyst, removing the catalyst when the rate of hydrogenation decreases substantially, adding fresh catalyst and continuing the hydrogenation under heat and pressure until the product has a melting point in excess of 25 degrees C., a thiocyanogen number less than 65, and an iodine number less than 145 (modified Wijs), whereby to maintain a high reaction rate between the tall oil and hydrogen.

2. The process of hydrogenating crude tall oil, which comprises intimately mixing and heating a finely divided solid adsorbent material at substantially 105-120 degrees C. with the crude tall oil for effecting an adsorptive removal of catalyst-poisons, separating the adsorbent material, and thereafter subjecting the tall oil to a temperature of 100 to 250 degrees C. in the presence of hydrogen under superatmospheric pressure in excess of essentially 50 pounds per square inch and in the presence of repeated separate charges of an elemental metal hydrogenating catalyst.

3. The process of hydrogenating crude tall oil which comprises dissolving the crude tall oil in a solvent and treating the solution with a suspended solid adsorbent material at a temperature of substantially 110-120 degrees C., removing the solid adsorbent material and solvent, and thereafter subjecting the tall oil to a temperature of 100 to 250 degrees C. in the presence of hydrogen under superatmospheric pressure in excess of 50 pounds per square inch and in the presence of repeated separate charges of an elemental metal hydrogenating catalyst until the melting point of the hydrogenated material exceeds 25 degrees C.

4. The process of hydrogenating crude tall oil, which comprises preparing a solution of the crude tall oil in naphtha with bleaching clay suspended therein and agitating at a temperature of 110 to 120 degrees C. in the presence of a non-oxidizing atmosphere, removing the clay and solvent, and thereafter subjecting the tall oil to a temperature of 100 to 250 degrees C. in the presence of hydrogen under superatmospheric pressure in excess of 50 pounds per square inch and in the presence of repeated separate charges of an elemental metal hydrogenating catalyst until the melting point of the hydrogenated material exceeds 25 degrees C.

RUSSELL G. DRESSLER.
ROBERT E. VIVIAN.